No. 881,274. PATENTED MAR. 10, 1908.
J. S. WILLIAMS.
COTTON CHOPPER.
APPLICATION FILED JULY 17, 1906.
2 SHEETS—SHEET 2.
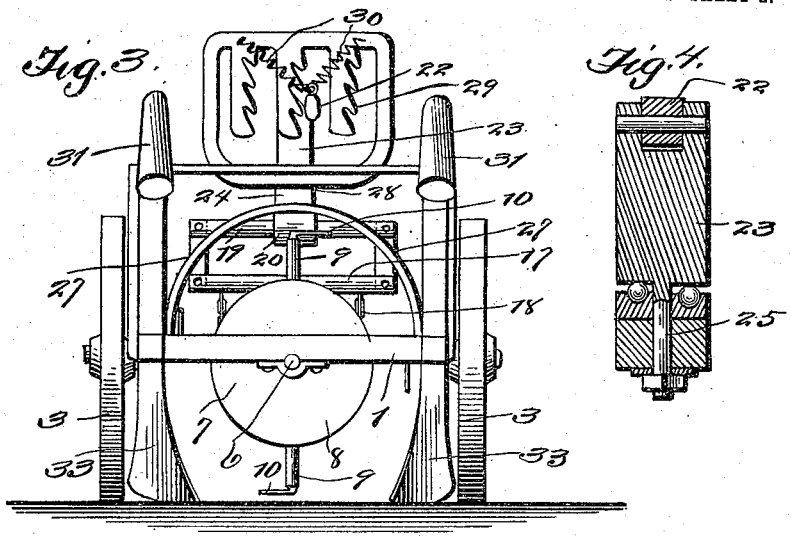
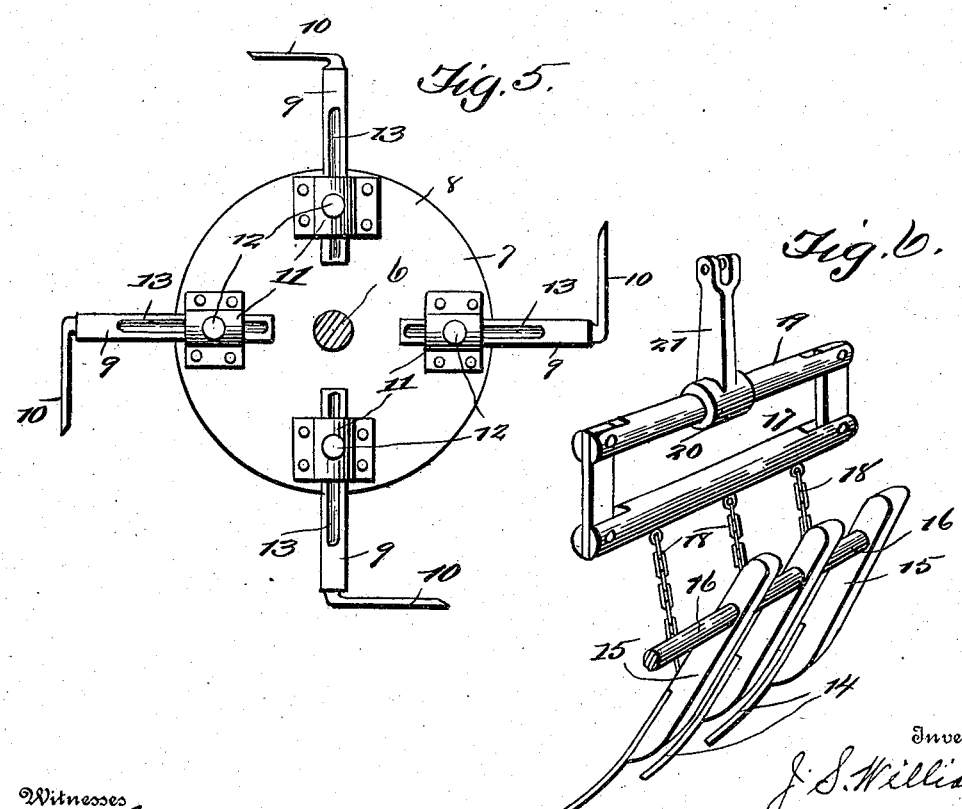
Witnesses
R. A. Boswell
K. J. Whitcomb
Inventor
J. S. Williams
By Swift &c.
Attorneys

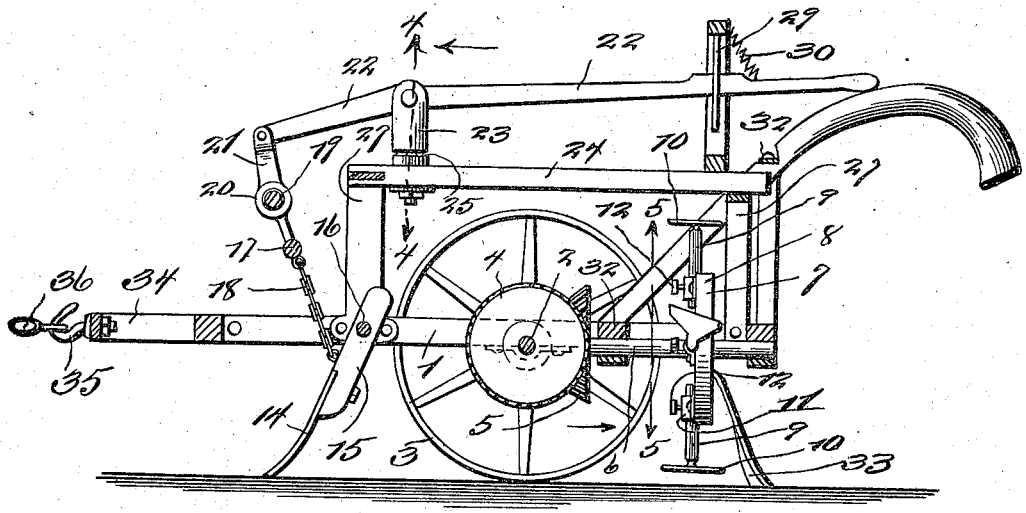

UNITED STATES PATENT OFFICE.

JOHN SCOTT WILLIAMS, OF COMMERCE, TEXAS.

COTTON-CHOPPER.

No. 881,274. Specification of Letters Patent. Patented March 10, 1908.

Application filed July 17, 1906. Serial No. 326,632.

*To all whom it may concern:*

Be it known that I, JOHN SCOTT WILLIAMS, a citizen of the United States, residing at Commerce, in the county of Hunt and State of Texas, have invented a new and useful Cotton-Chopper; and I do hereby declare the following to be a full, clear, and exact description of the invention, such as will enable others skilled in the art to which it appertains to make and use the same.

This invention relates to certain new and useful improvements in cotton choppers, the object of the invention being to provide an efficient and practical device of this character, whereby the construction thereof is considerably simplified, and having novel means whereby the cultivator blades may be raised more at one end than at the other, or they may be raised altogether, and upon an equal horizontal plane, thus regulating the depth of the blades into the soil.

A further object of the invention is to provide a device of this design, having a special form of rotary cutter, for severing the cotton, consisting of a disk, having a plurality of knife-carrying members, which are adjustable radially from the center thereof.

This invention comprises further objects and combinations of elements which will be hereinafter more fully described, shown in the accompanying drawings, and the novel features thereof will be pointed out by the appended claims.

To obtain a full and correct understanding of the details of construction, combinations of features, elements and advantages, reference is to be had to the hereinafter set forth description and the accompanying drawings in connection therewith, wherein Figure 1 is a vertical longitudinal sectional view through the cotton chopper. Fig. 2 is a top plan view thereof. Fig. 3 is a rear view of the device to show clearly the rack for adjustably holding the shaft of the cultivator blades. Fig. 4 is a detail sectional view on line 4—4 of Fig. 1, showing the swivel joint and the pivot of the lever for shifting the cultivator blades. Fig. 5 is a sectional view on line 5—5 of Fig. 1, to show more clearly the rotary cutter. Fig. 6 is a detail view of the frame for supporting the cultivator blades.

Making renewed reference to the accompanying drawings, wherein similar reference characters indicate corresponding parts in the several illustrations, by figures, 1 designates the frame of the device, in which is journaled the main drive shaft 2, upon which the drive wheels 3 are journaled, and also mounted thereon is a bevel gear 4, which is in mesh with a similar beveled gear 5, which is mounted upon a secondary shaft 6, extending at right angles to the shaft 2, to which is fixed the rotary cutter 7, consisting of a disk 8, having a plurality of knife-carrying members 9, to which are fixed the cutting knives 10; said knife-carrying members are adjustable by means of socket members 11, having thumb screws 12, mounted therein for the purpose of engaging the recesses 13 in said knife-carrying members, rendering them adjustable radially with relation to the disk, as clearly shown in Fig. 5 of the drawings.

The cotton chopper is provided with a plurality of cultivator blades 14, having a body portion 15 thereof, which are pivoted upon a shaft 16, journaled within the frame of the apparatus; the cultivator blades are raised more at one end than at the other, or are raised altogether, upon an equal horizontal plane, by means of a loosely jointed frame 17, which is connected with a body portion of the cultivator blades, by chains 18; the upper rod 19 of the loosely jointed frame 17 is provided with a sleeve 20, which is slidably mounted thereon, and provided with an upwardly extending arm 21, which is pivoted to an oscillating lever 22, as shown in Fig. 1 of the drawings. This oscillating lever is pivoted to a stud 23, which is connected to a longitudinal beam 24, by means of a swiveled joint 25; this longitudinal beam forms a part of the frame of the apparatus, and is secured, as at 26, to the arched braces 27, for the purpose of bracing the complete frame of the apparatus, as will be clearly observed.

Fixed to this longitudinal beam, as at 28, is a rack 29, for securely holding the oscillating lever in adjusted position; springs 30 are provided for coöperation in conjunction with said oscillating lever, to prevent displacement thereof, when adjusted, as will be understood.

Suitable handles 31 are provided, which are fixed to the frame of the apparatus, as at 32, and projecting downwardly from the frame, are cultivator blades 33, as shown in Fig. 1 of the drawings.

Projecting from the front of the frame 1 is a semi-circular loop 34, having an eye 35, to which an evener 36 is connected, as clearly shown in the drawings.

It is to be understood that various changes in the minor details of construction may be made, such as the adjustable feature of the knives of the rotary cutter, the loosely jointed frame for supporting the cultivator blades, and other features without departing from the spirit of the invention, with the understanding that such changes, as will be necessary, will be embraced within the scope of the appended claims.

From the foregoing, the essential features, elements and operation of the device, together with the simplicity and practicability thereof will be clearly observed, and, when, manufactured in accordance with the invention, an inexpensive market will be easily obtained therefor.

Having thus fully described the invention, what is claimed as new and useful by the protection of Letters Patent is:—

1. In a cotton cultivator, the combination of a frame; a drive shaft journaled therein; driving wheels therefor; a plurality of cultivator blades pivoted to the frame; a lever pivoted and swiveled to the frame and provided with a link at one end, having a sleeve; a flexible frame, a portion of which being slidable in said sleeve and provided with chain connections with the cultivator blades; a plurality of racks for holding said lever in adjusted position as and for the purpose specifically set forth.

2. In a cotton cultivator, the combination of a frame; a drive shaft journaled therein; driving wheels therefor; a plurality of cultivator blades pivoted to the frame; a lever pivoted and swiveled to the frame, and provided with a link at one end, having a sleeve; a flexible frame, a portion of which, being slidable in said sleeve and provided with chain connections with the cultivator blades; a plurality of racks for holding said lever in adjusted position for the purpose specifically set forth, and a revolving cutter having gear connections with the said drive shaft as and for the purpose specifically set forth.

In testimony whereof I have signed my name to this specification in the presence of two subscribing witnesses.

JOHN SCOTT WILLIAMS.

Witnesses:
W. J. TAYLOR,
I. C. PRICE.